(12) United States Patent
Sievert

(10) Patent No.: US 7,138,961 B2
(45) Date of Patent: Nov. 21, 2006

(54) MODIFICATION OF WIND TURBINES TO CONTAIN COMMUNICATION SIGNAL FUNCTIONALITY

(76) Inventor: Thomas Michael Sievert, 9405 Dice La., Lenexa, KS (US) 66215

( * ) Notice: Subject to any disclaimer, the term of this patent is extended or adjusted under 35 U.S.C. 154(b) by 46 days.

(21) Appl. No.: 10/847,541

(22) Filed: May 17, 2004

(65) Prior Publication Data

US 2004/0232703 A1 Nov. 25, 2004

(51) Int. Cl.
*H01Q 1/22* (2006.01)
(52) U.S. Cl. .................. 343/890; 343/720; 343/891
(58) Field of Classification Search ............... 343/878, 343/890–892, 720; 290/44
See application file for complete search history.

(56) References Cited

U.S. PATENT DOCUMENTS 4,617,572 A * 10/1986 Hugo ..................... 343/765
5,774,088 A * 6/1998 Kreithen ................. 342/22

FOREIGN PATENT DOCUMENTS

DE 4407673 C1 * 8/1995

OTHER PUBLICATIONS

Web Site http://www.tva.gov/greenpowerswitch/wind_faq.htm.
Web Site http://www.cetsolar.com/airindustrial.htm.
Web Site http://planning.org/zoningnews/askauthor0303.htm.
Web Site http://www.tva.gov/greenpowerswitch/wind_faq.htm, (May 2004).
Web Site http://www.cetsolar.com/airindustrial.htm, (May 2004).
Web Site: http://planning.org/zoningpractice/askauthor/03/askauthor0303.htm, (Mar. 2003).

* cited by examiner

Primary Examiner—Michael C. Wimer

(57) ABSTRACT

An apparatus comprised of a wind turbine tower removeably holding or containing antenna type devices. Such antenna type devices will be utilized to receive and/or transmit communication signals. The major advantage of this apparatus is that a single tower can be constructed containing the functionality of both a communications tower and a wind turbine tower. Substantial siting and construction costs may be saved by constructing one tower that can perform two functions; as opposed to siting and constructing two separate towers.

19 Claims, 16 Drawing Sheets

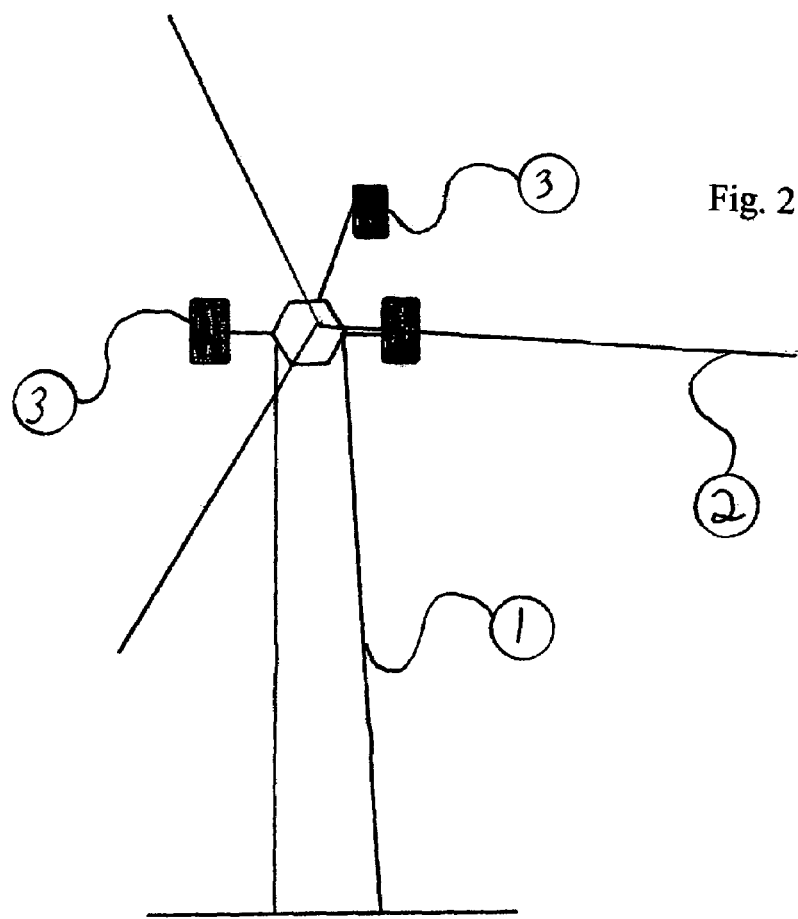
Fig. 2
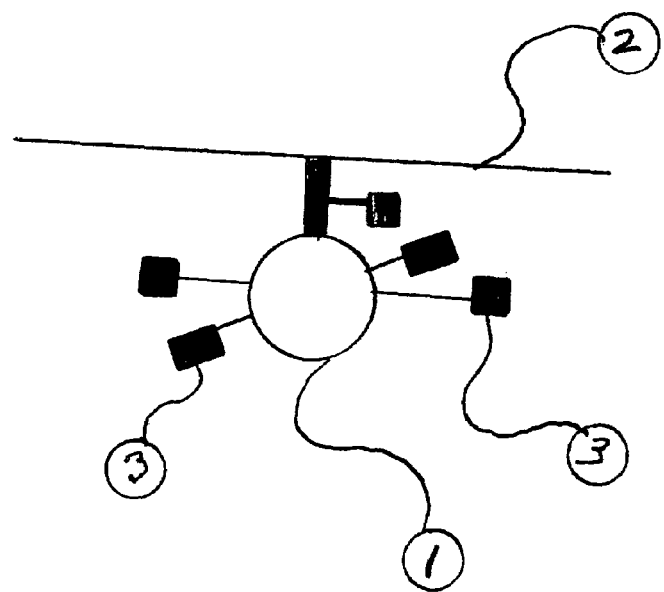

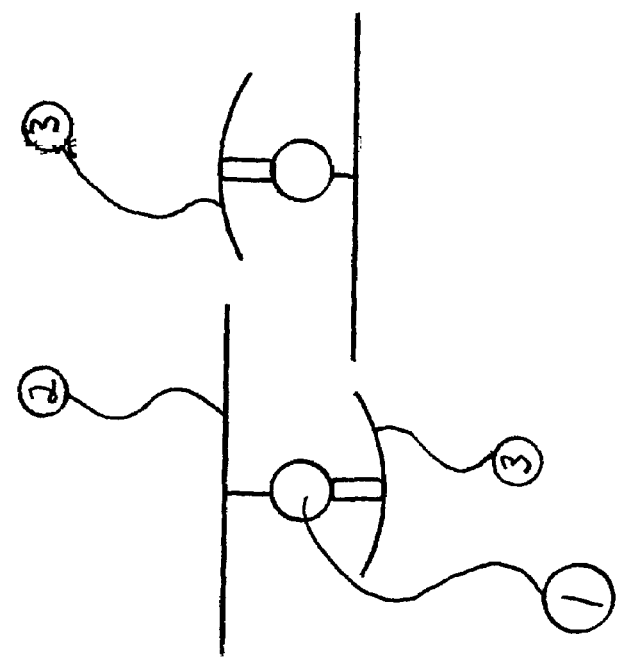
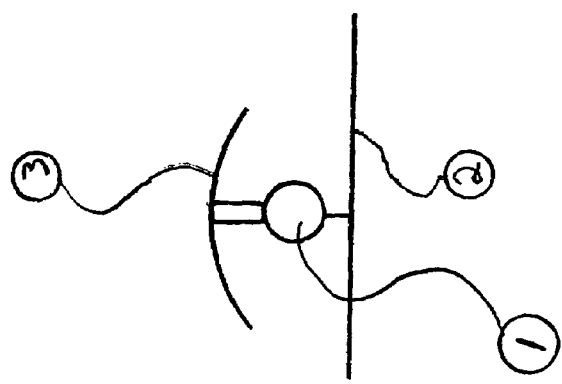
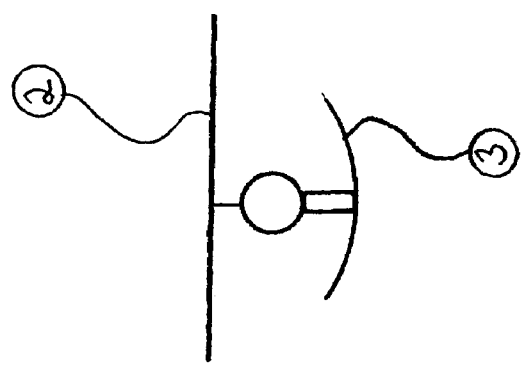
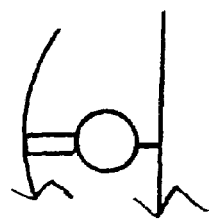
Fig. 11

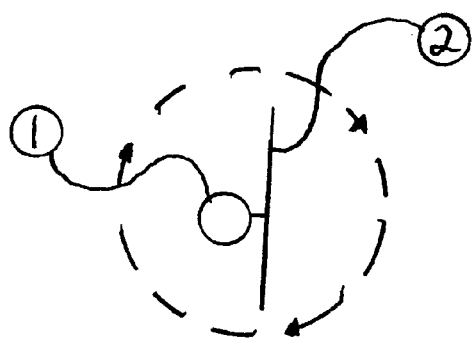
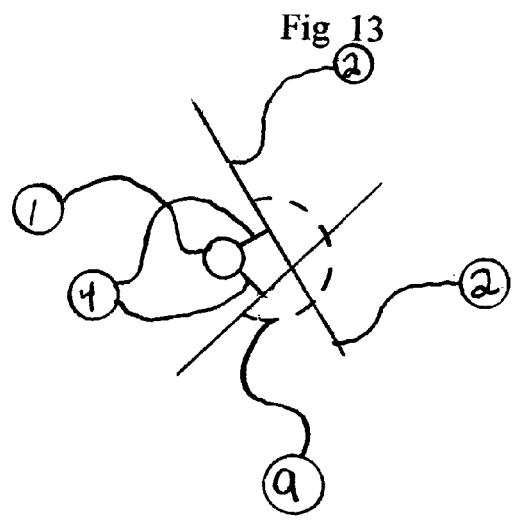
Fig 13
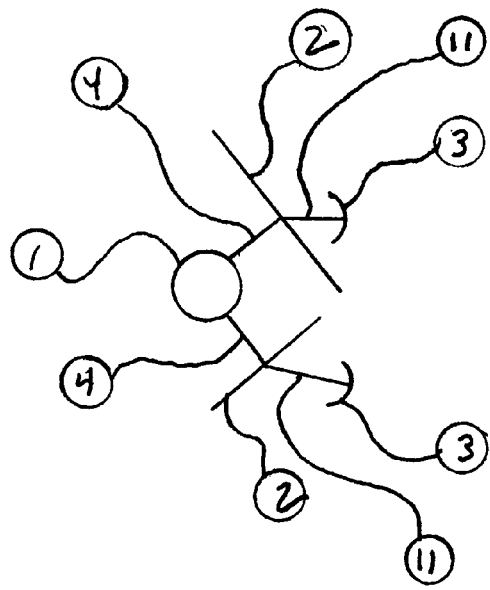

CRUDE EXAMPLE OF A DESIGNER TOWER   Fig. 15

MODIFICATION OF WIND TURBINES TO CONTAIN COMMUNICATION SIGNAL FUNCTIONALITY

FIELD OF THE INVENTION

The present invention proposes the development of a dual-purpose structure comprised of a wind turbine tower utilized for electrical power generation, modified to operate as, or contain the functionality of a communications tower such as a tower for cellular, television, short wave, satellite, and/or radio communications (or a tower capable of multiple types of signal communication).

BACKGROUND OF THE INVENTION

There has been a significant proliferation of cellular communication towers worldwide. These towers are sited virtually everywhere that the demand for cellular communication is significant enough to justify their construction. These towers are very expensive to build.

At the same time that the proliferation of cellular communication towers has occurred, significant advances have been made in the design of wind turbines; fixed towers that have a turbine generator mounted on them that is powered by large rotating blades that are driven or propelled by the wind.

The amount of electricity that a wind turbine can generate is measured in kilowatt hours (kwH). The cost of generating electricity per kwH using wind turbines has declined significantly in recent years from approximately $0.30/kWh in 1981 to approximately $0.05–$0.08/Kwh. This decline in costs has led to the construction of large-scale developments of aggregates of wind turbines—called wind farms.

In Kansas, the Gray County Wind Farm recently became operational. It is the largest wind project in the U.S. not mandated by a state regulatory commission as part of a utility company's energy mix—which is reflective of changing cost structure of wind turbine construction. The farm consists of 170 turbines with a combined generation capacity of 110 megawatts. Compared to the emissions from 110 megawatts of coal-fired generation, the Gray County Wind Farm reduces carbon dioxide (CO2) emissions by 600 tons annually. This is the CO2 emission absorption equivalent of having a 120 square mile forest on the southwest Kansas plains.

Wind turbines function most efficiently where the wind resources are strong enough to allow for the consistent generation of electricity. A major drawback to utilizing wind turbines as cellular communications towers is that it is perceived that wind resources sufficient to power a wind turbine are generally not located in areas where cell coverage is needed—in and near large urban areas. I make three points in response to this:

First, wind turbines are quite tall; the turbine towers in the Gray County Wind Farm are 217 feet high at the hub. Towers are available from manufacturers which stand in excess of 300 feet at the hub. At these heights, wind resources are typically much stronger then at surface level. This means that the wind resources required to operate wind turbines successfully cover a much larger area—including many urban locations—than would be anticipated if wind resources were measured at surface level.

Secondly, the ability to combine two types of towers, a wind turbine tower and a communications tower, into one structure will have a positive impact upon the economics of tower construction. This will mean, ultimately, that the minimum wind resources required to make wind turbines economically viable will be lower or weaker relative to the minimum wind resources required for the viability of a stand-alone wind turbine, from a cost justification standpoint Finally, there is a push to develop wind turbines that operate at relatively low speeds. This type of turbine technology, called low speed wind technology, is focusing on improvements required in three areas:

1. Turbine rotor diameters must be larger to harvest the lower energy winds from a larger inflow area without increasing the cost of the rotor.
2. Towers must be taller to take advantage of the increasing wind speed at greater heights.
3. Generation equipment and power electronics must be more efficient to accommodate sustained light wind operation at lower power levels without increasing electrical system costs.

Building a stand-alone tower of either of the two types of towers discussed—a cellular communications tower or a wind turbine tower—is very expensive. Accordingly there has been a continuing search to reduce the costs of building these towers.

The present invention proposes the development of a dual-purpose structure to be used as a cellular communications tower and as a tower that would contain a wind turbine for electrical power generation. Primarily, the present invention proposes that the basic wind turbine structure will remain dominant or relatively unchanged in design. The features that modify the wind turbine structure so that it obtains communications functionality will be attached, possibly as an optional "kit" or "add-on" feature; or result in relatively minimal changes to the overall operation or construction of the wind turbine tower.

The advantage of this configuration is, primarily, that one tower can be built that will have a dual purpose—instead of two towers. This would result in significant savings in costs. In addition, these combined towers may be located in sites that are designated for cell towers—siting expenses could be saved.

It is noted here that the focus of the discussion of the present invention relates to cellular signal transmission and reception. However, it is noted that the present invention may be utilized for other types of signal transmission and reception including, but not limited to, television, radio and short wave signal transmission and reception (or a combination of different types of signals).

Although I have seen no prior art with respect to the specifics of the present invention as discussed in detail below, the general concept for combining wind turbine towers and cellular antenna is known. The following web links discuss this:

http://www.tva.gov/grreenpowerswitch/wind_faq.htm,
http://www.cetsolar.com/airindustrial.htm,
http://planning.org/zoningnews/askauthor0303.htm.

I respectfully disclose that I have not seen or heard of any other prior art with respect to the specifics of my invention.

SUMMARY OF THE INVENTION

According to the present invention, an improved method has been developed for the manufacture of communications towers and wind turbine towers. This method consists of locating the antenna on the wind turbine tower in such a manner, and using such a configuration, that the wind turbine tower may be used effectively as a communications tower.

A major problem that that the present invention addresses is communications signal interference brought about by, or resulting from, rotating turbine blades. To overcome this problem, the invention proposes various types of approaches including: (1) the configuration of cellular antenna on a turbine tower is in such a manner as to create overlapping fields of signal propagation where the signal of certain antenna is effective, or dominant, for a specific span of time while the signal from other antenna is being hindered or impeded by the rotating turbine blades; (2) the affixing of a lattice type of antenna on the front of the turbine blades which serves to operate as an antenna, and; (3) the siting of wind turbines containing antenna, optionally combined, with regular stand-alone antenna towers, in such a manner so that signal coverage from all of the antenna in combination, is effective or complete enough for adequate signal coverage.

BRIEF DESCRIPTION OF THE DRAWINGS

Other features of the present invention will be more readily understood from the following detailed description of specific embodiments thereof when read in conjunctions with the accompanying drawings in which:

FIG. 2 contains two views; a perspective view (top drawing) where antenna are mounted at an infinite variety of positions with the foci, or center point, of those positions being the axle of the turbine blade. A top view (bottom drawing) depicts the position of the antenna relative to a cross section of the tower;

FIG. 11 is a top view of an aggregate of wind turbine towers arranged so that the antenna affixed to the towers are on alternating sides, serving to create an overlapping and/or interlocking pattern of signal coverage;

FIG. 13 contains a top view of a wind turbine tower where the angle that the turbine blade can rotate on its axis (called yawl) is limited, and the antenna are mounted on an arm or extension that is configured to maintain a constant forward facing position;

DETAILED DESCRIPTION OF THE PREFERRED EMBODIMENTS

It should be stated that the proportions between the various elements show in the figures are not rigorously respected in the figures, in order to facilitate an understanding thereof.

Figure 1:
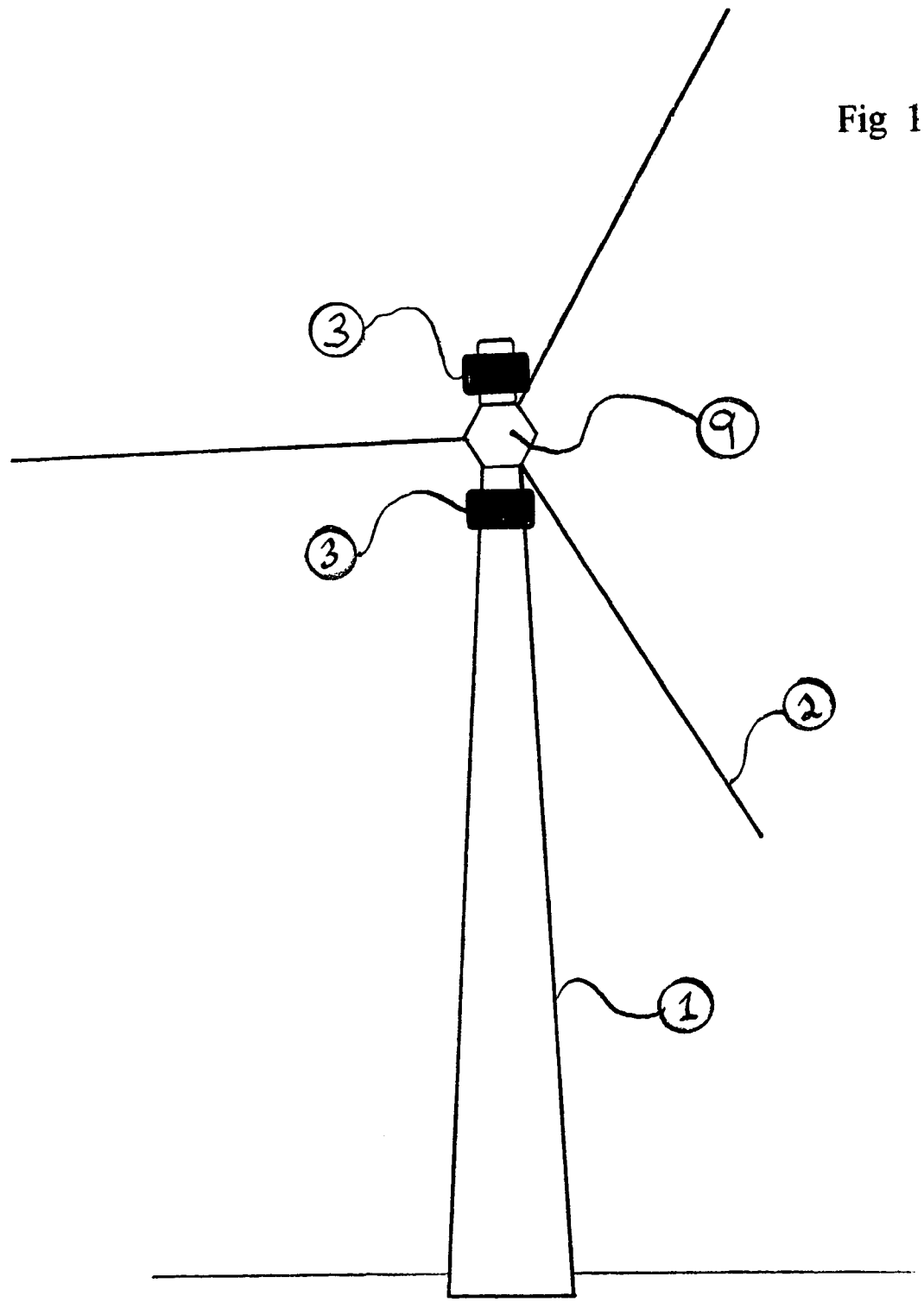
FIG. 1 is perspective view of antenna mounted on a wind turbine tower both above and below the axle of the turbine blade (note that the phrase "tower antenna" or "tower antennas" refers to mounted antenna (i.e. mounted on a tower or nacelle as indicated, for example) and not to any specific type of antenna design or configuration)

In FIG. 1 antenna (3) configured on, affixed to, or inside of the tower (1) are positioned both above and below the foci, or axle (9), of the rotating turbine blades (2). (In addition the antenna may be on, affixed to, or inside of the pod containing the turbine—called the nacelle). Since there are three turbine blades (2), there will be, at all times, an antenna that is not blocked or impeded from signal transmission and/or reception by the rotating turbine blades (2). Using this concept, signal transmission and reception may be configured to alternate between the antenna (3) located above and the antenna located below the center of the rotating blades (2)—depending upon when blade blockage or impedance of the antenna (3) occurs. Note that antenna (3) may be located on all 360 degrees of the tower (1) and that the antenna (3) that is on the turbine blade (2) side of the tower (1) may, optionally, transmit an alternating signal (the antenna that is not blocked will transmit the signal—thus resulting in the top, then bottom, then top, etc. antenna transmitting the signal while the blades rotate); or both the top and bottom antenna may operate at varying levels of power, including full power, simultaneously. The antenna that is located on the side of the wind turbine tower that is opposite of the turbine blade is not required to transmit an alternating signal.

In FIG. 2 two or more antenna (3) are positioned in a variety of locations emanating from a point at or near the center, or axle of the rotating blades (2). This is an alternative embodiment of FIG. 1 where the antennas are located above and below the center of the rotating blades. FIG. 2 illustrates that two or more antenna operating in a complimentary manner to overcome the interference brought about by rotating turbine blades, may be positioned in a variety of patterns—not exclusively above and below the center of the rotating turbine blades (2). It should be noted that the power level of individual antenna (3) configured in complimentary patterns as noted may, optionally, vary or alternate between antenna (3), as a turbine blade impedes its signal reception and transmission, or it may not vary or alternate.

Figure 3:
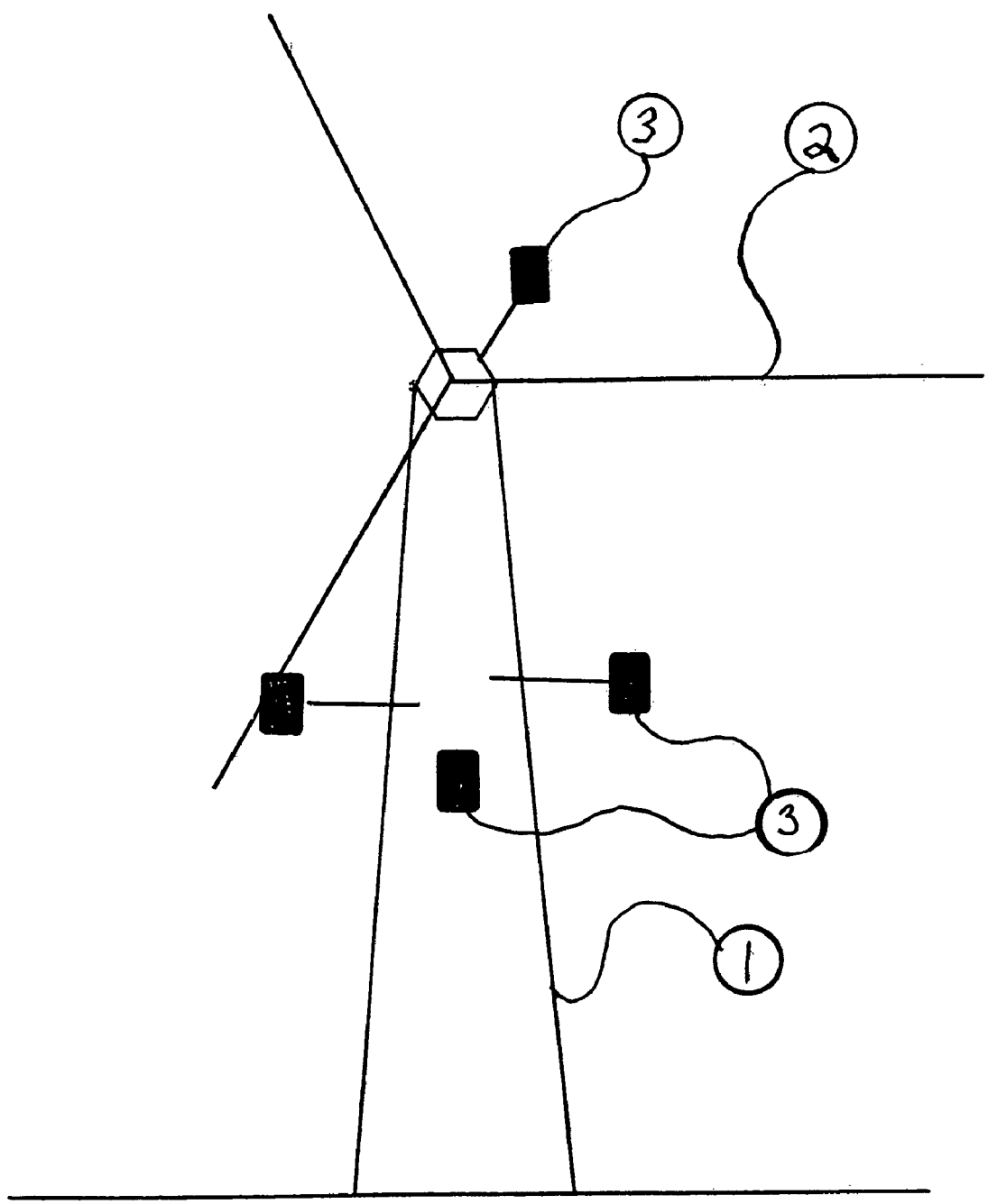
FIG. 3 is a perspective view of antenna situated at a variety of positions on the tower.

In FIG. 3 two or more antenna (3) are positioned in a variety of locations on, or attached to, the tower (1) (as opposed to emanating from a point at or near the center of the rotating blades). This is an alternative embodiment of FIG. 1 where the antennas are located above and below the center of the rotating blades. FIG. 3 illustrates that two or more antenna operating in a complimentary manner to overcome the interference brought about by rotating turbine blades, may be positioned in a variety of patterns—not exclusively above and below the center of the rotating turbine blades (2). It should be noted that the power level of individual antenna configured in complimentary patterns as noted may, optionally, vary or alternate between antenna, as a turbine blade impedes its signal reception and transmission, or it may not vary or alternate.

Figure 4:
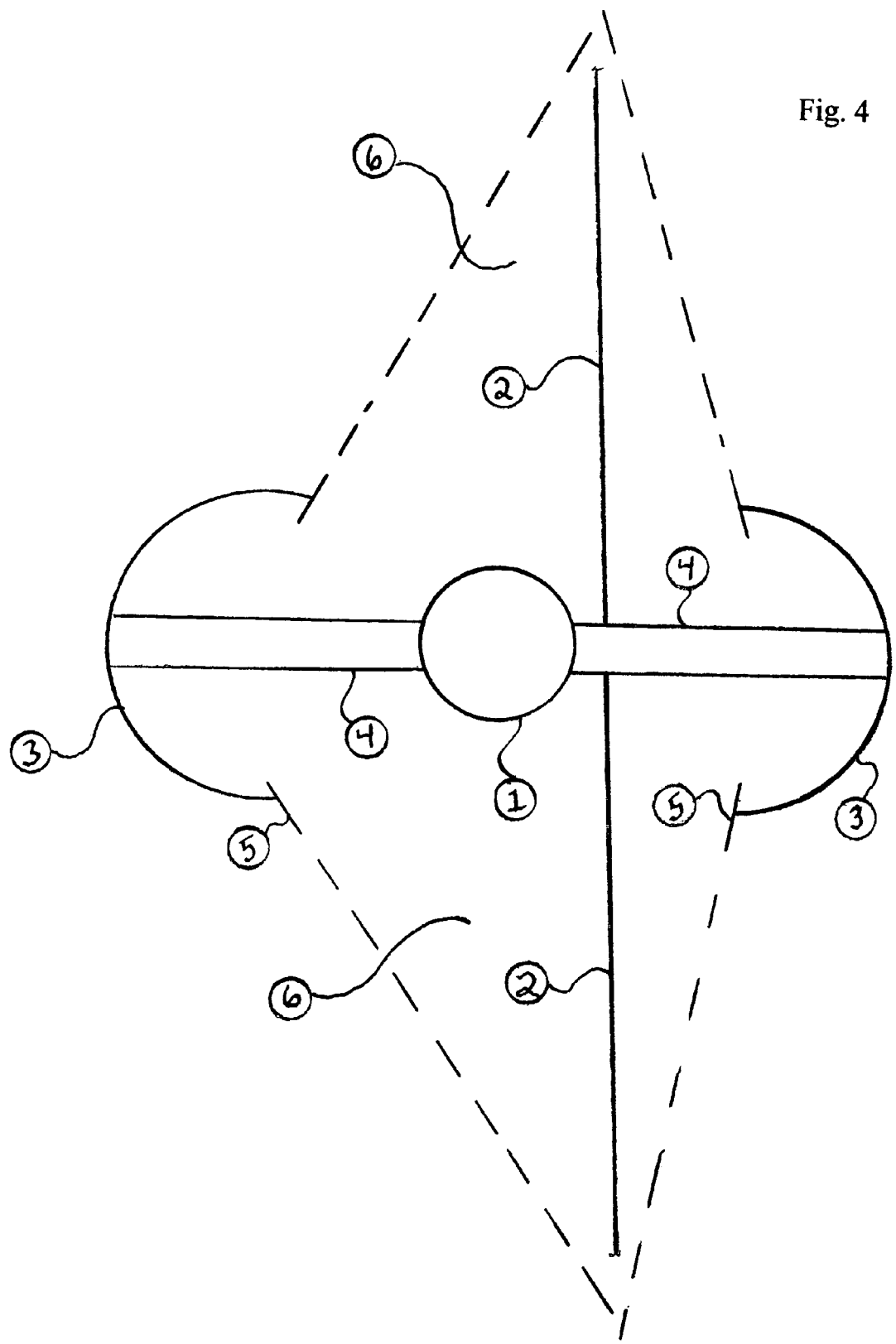
FIG. 4 is a top view of a tower with antenna located on an extension. The extension serves to hold or suspend the antenna away from the rotating turbine blades.

In FIG. 4, a top view of a turbine tower (1), the axle (4) that the turbine blades (2) rotate on is elongated. At both ends of the axle (4) are located a structure that is an antenna (3) or functions to hold or contain antenna (3). Note that at each end of the structure (3) is a signal baffle or blocking structure (5) that blocks the transmission and reception of signals to minimize interference from rotating blades (2). These blocking structures (5) create a signal "dead zone" (6) where no signal transmission and/or reception occurs. This zone would be limited to the area in the immediate vicinity of the turbine blades (2).

Figure 5:
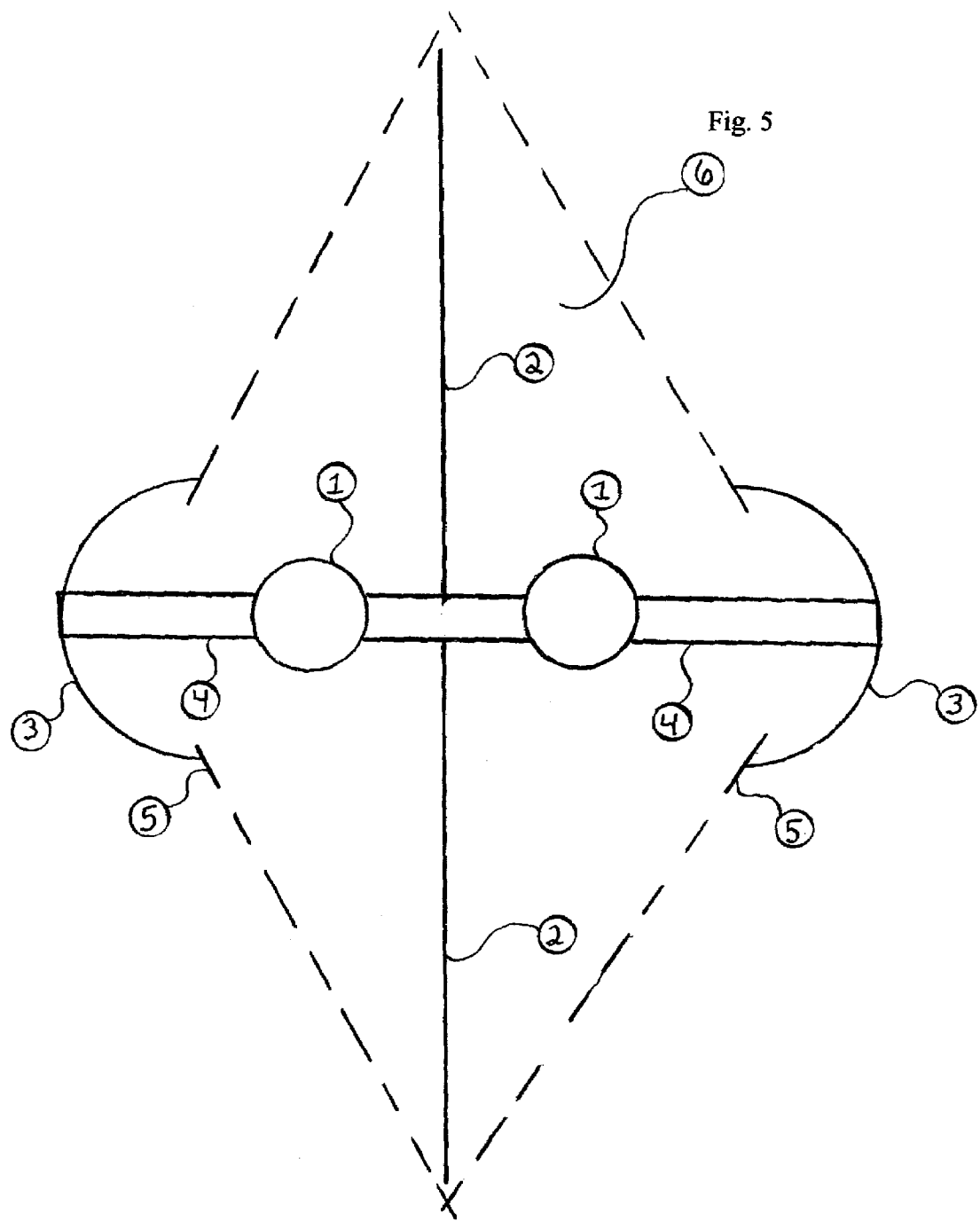
FIG. 5 is a top view of a fixed position, dual tower, wind turbine with an extension through both towers which serves to hold or suspend the antenna away from the rotating turbine blades.

FIG. 5 is a top view of a pair of turbine towers (1) configured to hold a turbine blade (2). Two towers are utilized to provide stability for both the antenna structures (3) and the rotating blades (2). Signal baffles or blocking structures (5) are depicted which create a signal "dead zone" (6) where no signal transmission and/or reception occurs. This zone should be limited to the area in the immediate vicinity of the turbine blades (2).

Figure 6:
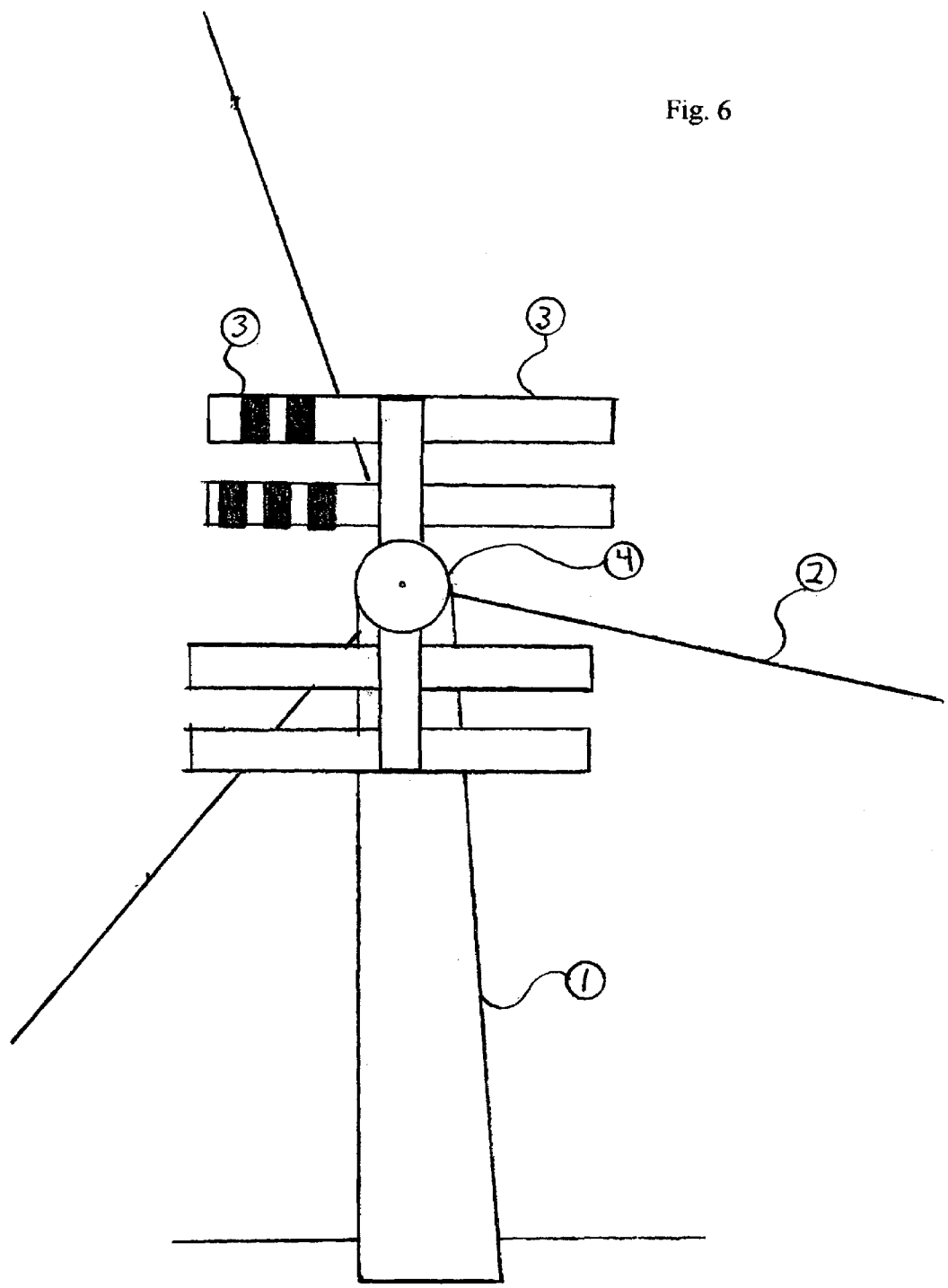
FIG. 6 is a perspective view of antenna that is mounted on a frame which is projected in front of the rotating turbine blades.

FIG. 6 is a front view of an antenna structure (3) attached to an elongated axle (4) extending forward from the turbine tower (1). The structure (3) extends up and down from the end of the axle (4). Arms of the structure (3) radiate left and right which functions to increase the amount of area available to hold or contain antenna surfaces.

Figure 7:
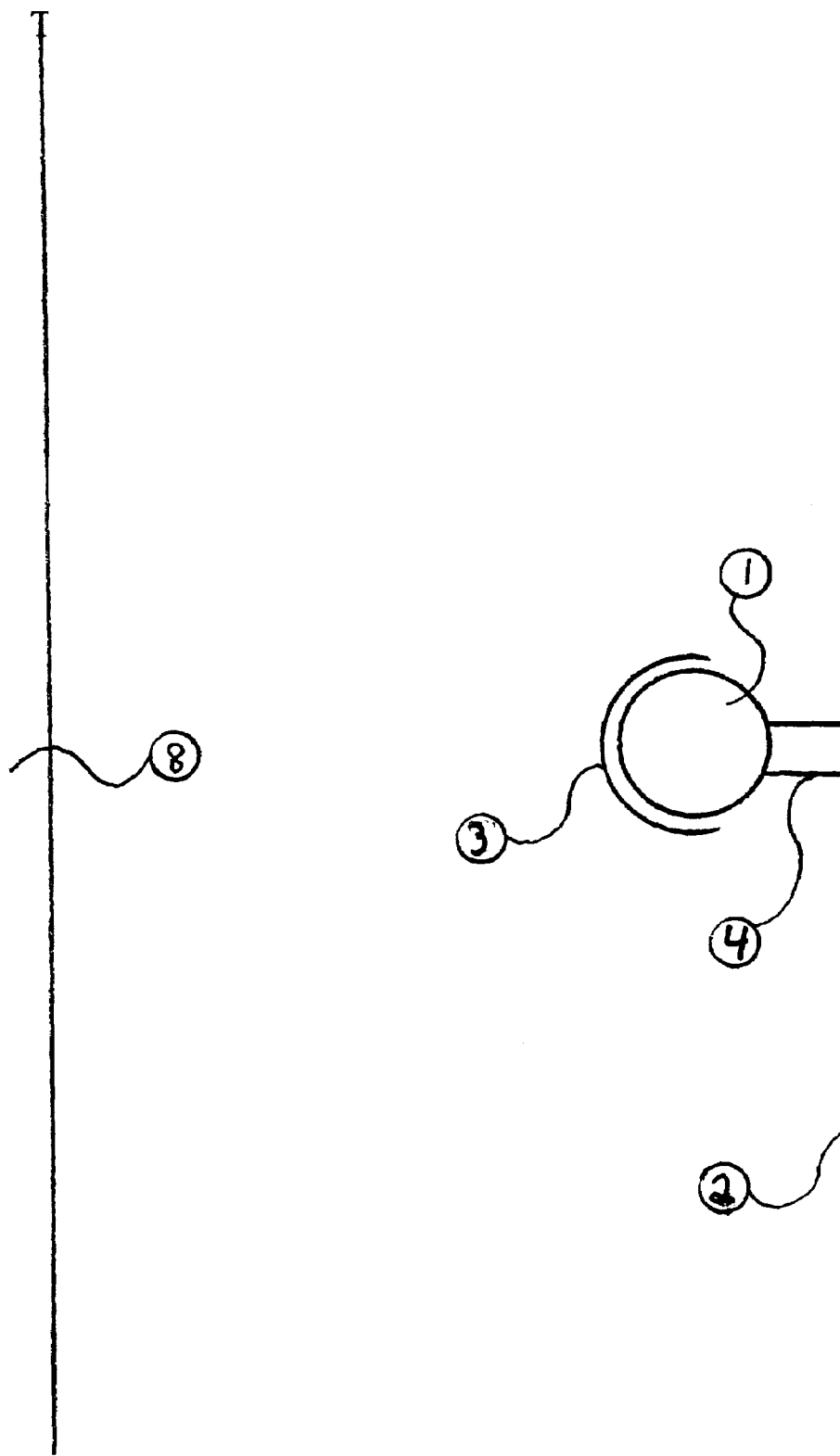
FIG. 7 is a top view of antenna mounted on one side of a tower with the turbine blades rotating on the opposite side of the tower.

FIG. 7 is a top view of antenna (3) mounted on one side of a wind turbine tower with the turbine blades (2) located on the opposite side of the tower (1). This drawing is an example of a wind turbine tower located in an offshore location. In this drawing, the blades (2) are fixed on the "sea" side of the tower (1). The antenna (3) are fixed on the land (8) side of the tower (1) where signal transmission and reception is required. This configuration would be workable in an offshore location since it anticipated that wind would tend to move regularly sea to land, or land to sea; and not in a direction perpendicular to, or in a manner significantly varying from, the land/sea direction.

Figure 8:
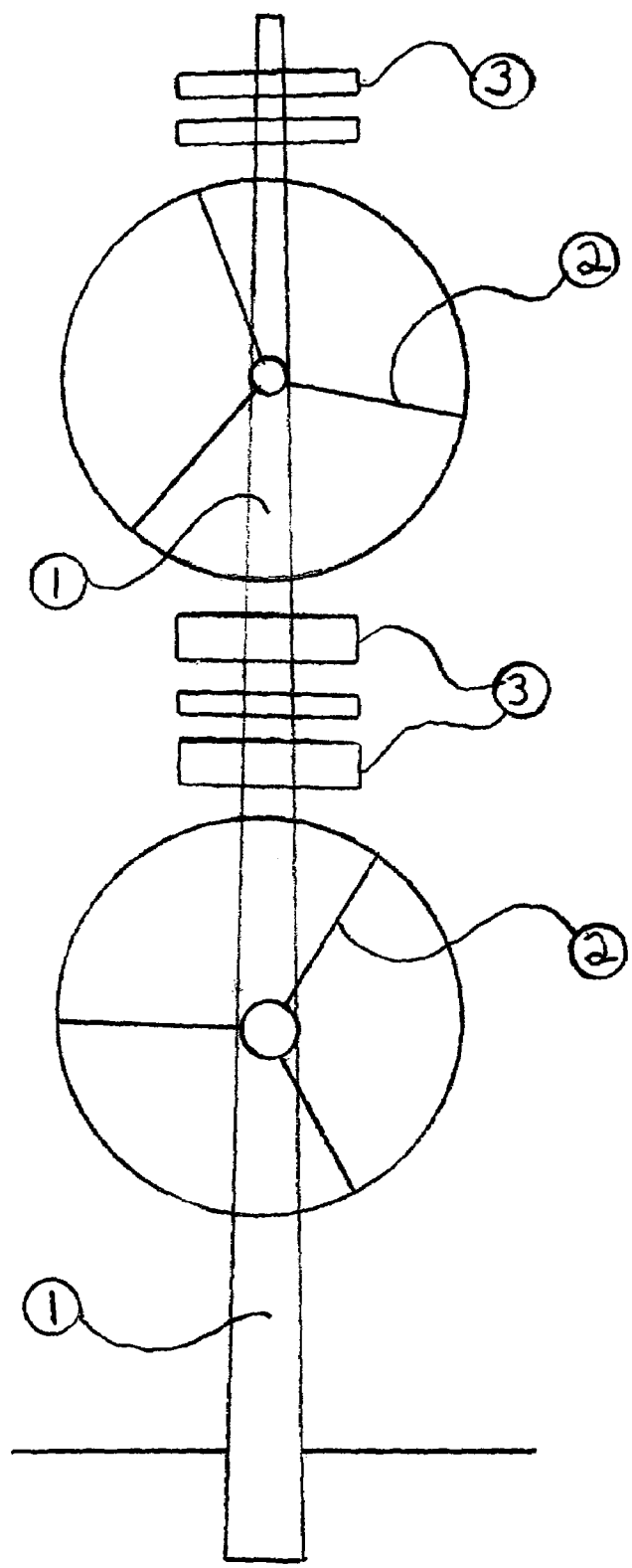
FIG. 8 is a perspective view of an antenna mounted on a tower which contains two rotating turbine blades.

FIG. 8 is a perspective view of antenna (3) mounted on a tower (1) with more then one rotating turbine blade (2) configured on the same tower (1). Antenna (3) are located in between each turbine blade (2) and on top of the tower (1). (Note that the tower (1) may be elongated to extend above the rotating turbine blades (2). This will result in antenna (3) being located above the interference of the blades (2). An advantage of this approach is that antenna (3) will be located at a greater altitude, resulting in improved signal transmission.)

Figure 9:
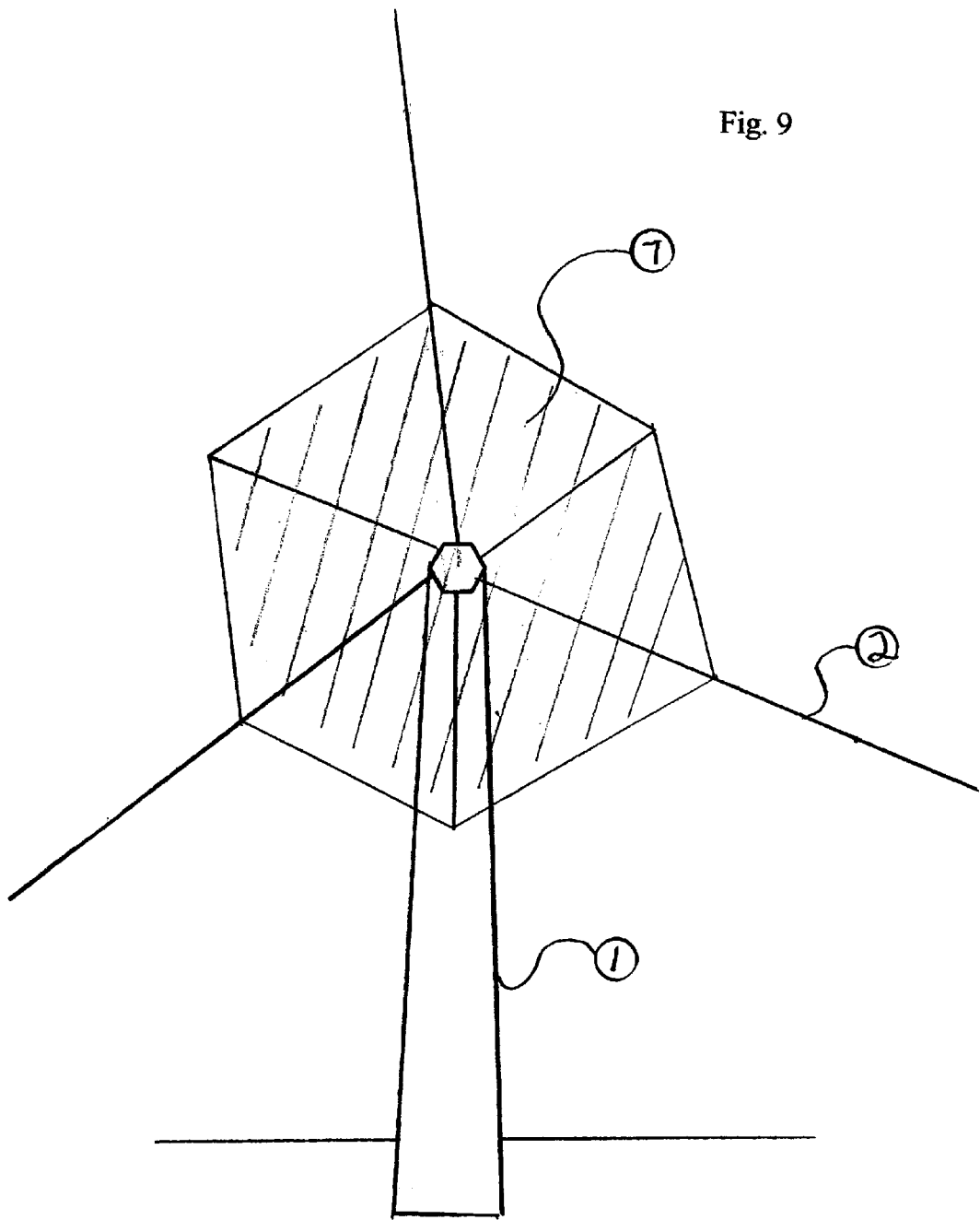
FIG. 9 is a perspective view of an antenna, which is of a screen, mesh or lattice type of configuration, mounted on, in back of, or in front of the rotating turbine blades.

FIG. 9 is a perspective view of a wind permeable screen, mesh or lattice type of configuration (7) serving as an antenna, configured on, or attached to, the turbine blades (2). It is important to note also that the turbine blades (2) may be coated, covered with, or constructed of, material that can transmit and/or receive signals.

Figure 10:
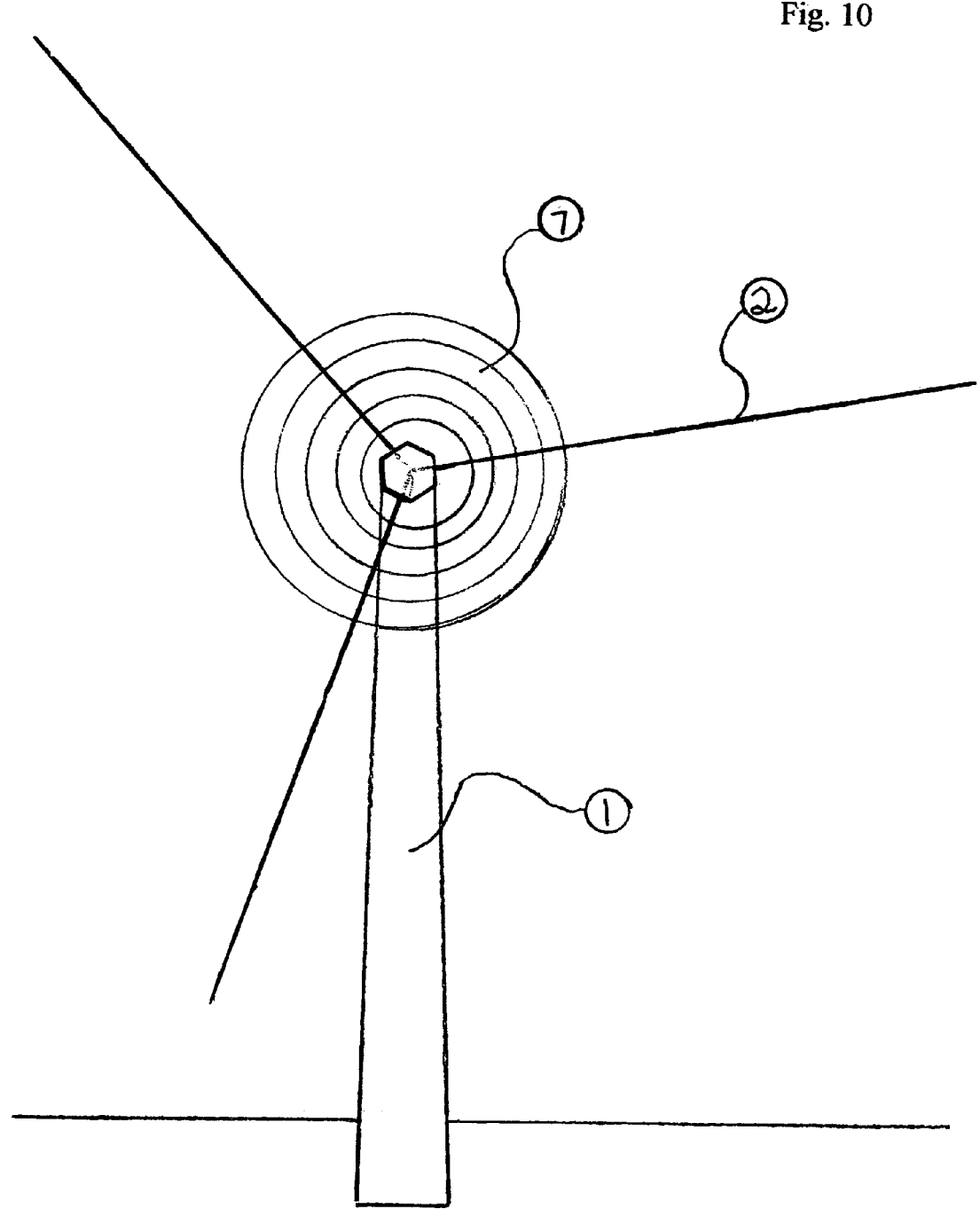
FIG. 10 is a perspective view of a circular shaped antenna, which is of a screen, mesh or lattice type of configuration, mounted on, in back of, or in front of the rotating turbine blades.

FIG. 10 is an alternative embodiment of FIG. 9. In FIG. 10 the screen, mesh or lattice type of antenna (7) configuration, is round to more closely approximate the shape of an antenna dish.

FIG. 11 is a top view of an aggregate of wind turbine towers arranged so that the antennas affixed to the towers are on alternating sides. This approach serves to create an overlapping and/or interlocking pattern of signal coverage. FIG. 11 introduces the concept of a "farm" or grouping of more than one tower for power generation and signal coverage for a given area. Note that the turbine blades (2) alternate on one side of the tower (1), and then on the other side of the tower (1), with antenna (3) on alternating sides, creating an overlapping and or interlocking pattern of signal coverage.

Figure 12:
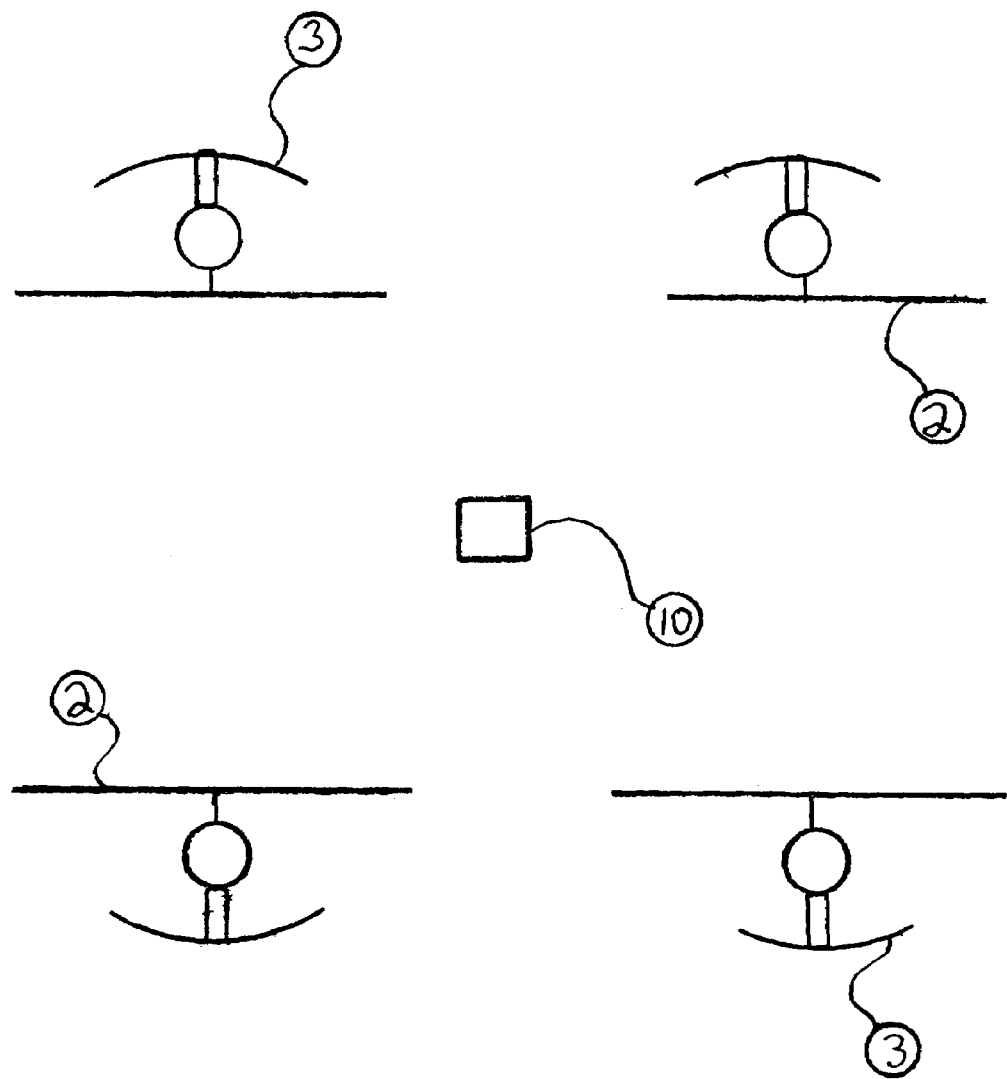
FIG. 12 is a top view of a selection of wind turbine towers that have attached antenna, combined with wind turbine towers that are used only for signal transmission and/or reception.

FIG. 12 introduces the concept combining wind turbine towers that contain antenna (3) with standard cellular towers (10). In this configuration, standard cellular towers (10) are utilized for signal coverage in areas where it is not feasible to construct wind turbine towers.

In FIG. 13 the degree to which a wind turbine may turn on its axis (called "yawl") to position the blades (2) properly is limited to a certain number of degrees of clockwise or counterclockwise rotation (9). This could help in keeping the antenna (3) properly positioned. Limiting the yawl may be a major problem in areas where the wind direction changes significantly. However, a yawl limitation may not be a significant problem where the wind direction does not change much—or changes distinctly from one direction to the opposite direction—as is frequently the case with land/sea breeze changes for shore or near-shore sited wind turbines. Note that it may be necessary to compensate for yawl, even if significantly limited or restricted, by positioning the antenna on a moveable or adjustable arm (11) in order to keep the antenna facing in a forward position.

Figure 14:
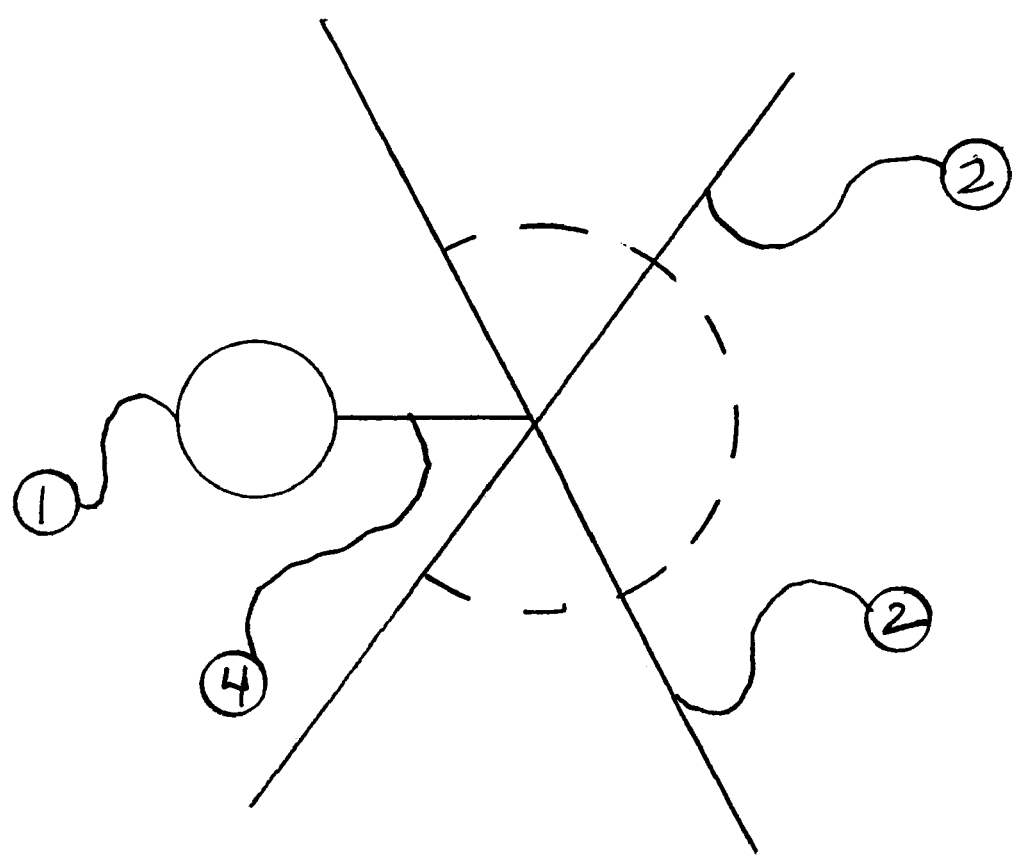
FIG. 14 contains a top view of a wind turbine tower where the angle that the turbine blade can rotate on its axis is limited.

In FIG. 14 the turbine blades (2) are affixed to a stationary axle (4) which is mounted to a non-rotating tower (1). The turbine blades my rotate or shift (yawl) a limited number of degrees at the point where the turbine blades are affixed to the axle. This is an alternative embodiment of FIG. 13 (where the turbine tower rotates on its axis) and may be used to limit the amount of rotation of the turbine blades (2) due to a change in wind direction. This may be useful in the situation where the prevailing winds are consistent in direction (such as in the direction from left to right on the drawings).

Figure 15:
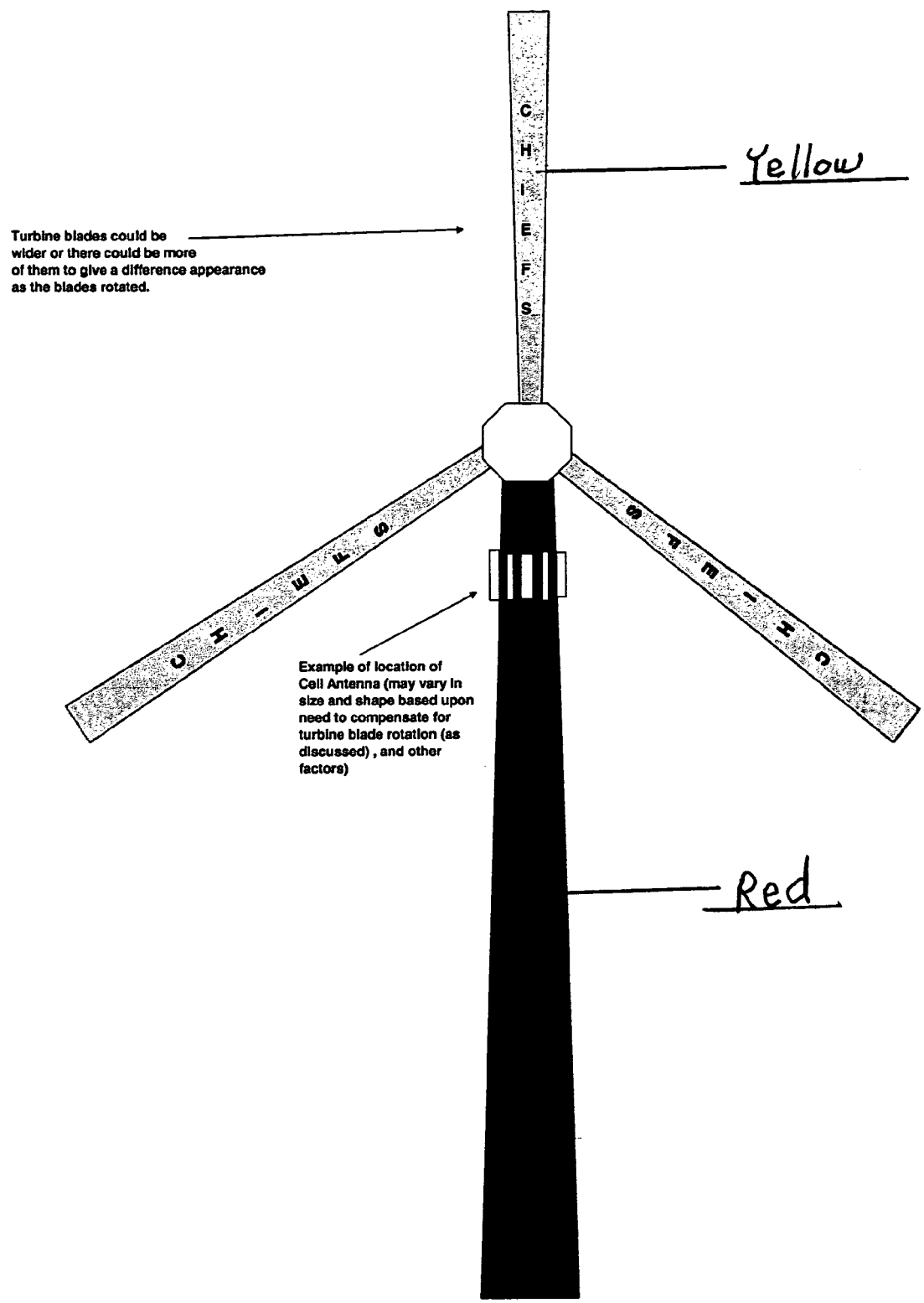
FIG. 15 contains a front view of a wind turbine tower with attached antenna that has a customized appearance in order to make it more acceptable to site or locate in urban areas.

In FIG. 15 we have an example of a front view of a wind turbine tower with attached cellular antenna that has a customized or modified appearance in order to make it more acceptable to site the tower in urban areas (note colors indicated). Wind turbine towers are normally located away from urban centers in aggregates, or collections, called wind farms. It may be possible to establish wind farms in urban areas—possibly replacing existing cell towers. However, to do this the appearance of the turbines may need to be customized or modified to make them more acceptable to the individuals living in the area. Such customization or modification may come in the form of applying the color scheme and/or the logo of a sports team, an educational institution such as a college or university, or a business enterprise affiliated with or located in the area.

Figure 16:
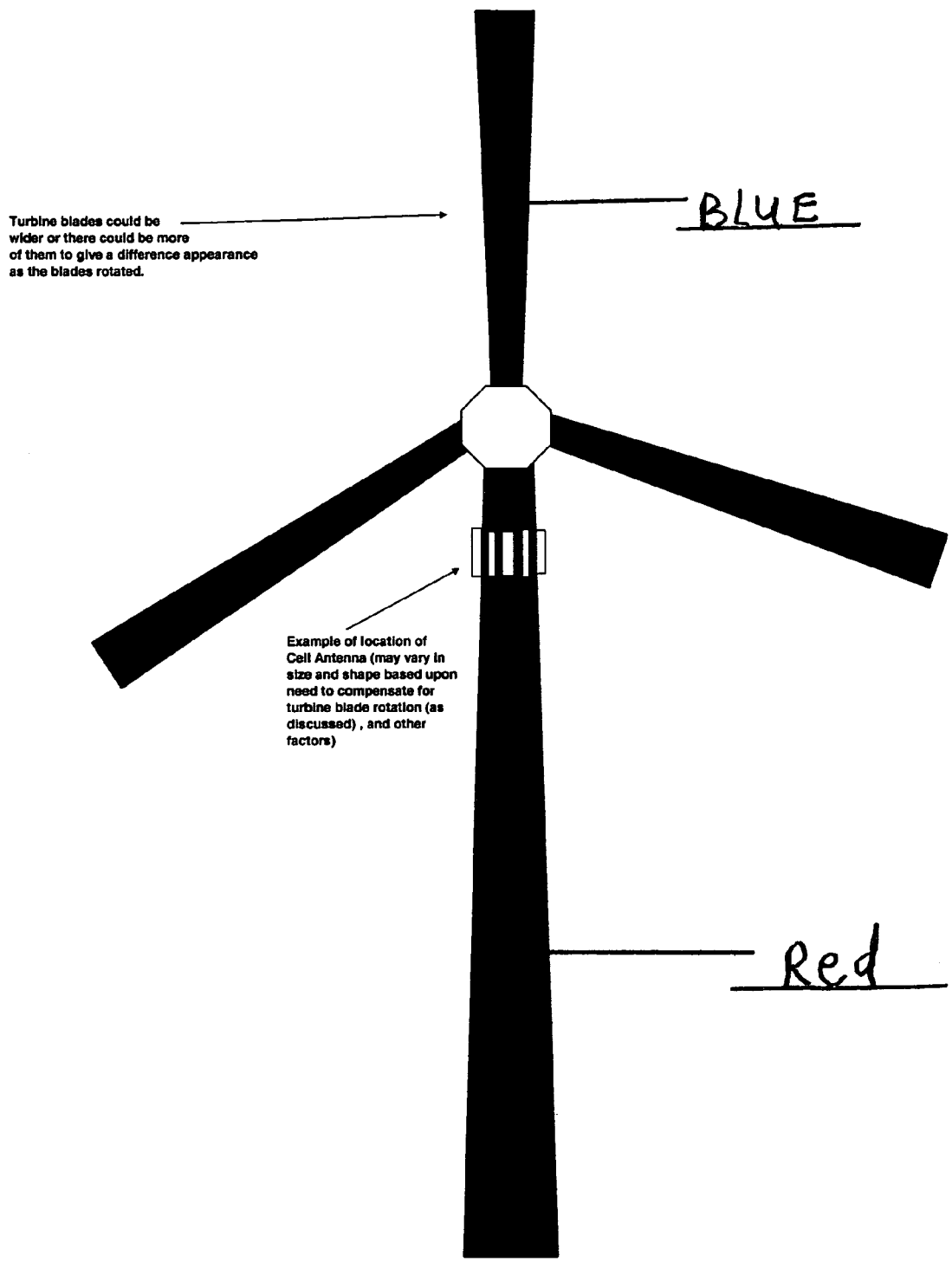
FIG. 16 contains a front view of a wind turbine tower with attached antenna that has an alternative customized appearance; the appearance is customized in order to make it more acceptable to site in urban areas.

FIG. 16 is an example of an alternative embodiment of FIG. 15 where an alternative customization or modification of the wind turbine is utilized (note colors indicated).

The reader is reminded that the focus of the above discussion of the present invention is significantly related to cellular signal transmission and reception. However, it is

Having thus described the invention, what is claimed is:

1. A tower comprising:
   at least two turbine blades rotatably mounted to said tower and coupled to a generator configured for generating electricity;
   at least two tower antennas mounted to said tower, said at least two tower antennas being configured for transmitting signals to at least one remote antenna; and
   wherein said at least two tower antennas are positioned so that, when at least one of said at least two turbine blades impedes the transmission of signals from at least a first one of said at least two tower antennas to said at least one remote antenna, then at least a second one of said at least two antennas is enabled for transmitting signals to said at least one remote antenna.

2. The tower of claim 1, wherein said at least two tower antennas are further configured for receiving signals from said at least one remote antenna.

3. The tower of claim 1, wherein said signals comprise at least one of cellular telephone signals, television signals, radio signals, and short wave signals.

4. The tower of claim 1, wherein said at least two turbine blades consist of three turbine blades.

5. The tower of claim 1 wherein said at least two turbine blades are rotatably mounted on an axle secured to said tower, and said at least first one of said at least two tower antennas is positioned on said tower above said axle, and said at least second one of said at least two tower antennas is positioned on said tower below said axle.

6. The tower of claim 1 wherein said at least two tower antennas are operable contemporaneously at the same level of power.

7. The tower of claim 1 wherein each of said at least two tower antennas are independently operable at diminished power levels when the transmission of signals from a respective antenna is impeded by one of said at least two turbine blades.

8. A system for transmitting signals, said system comprising:
   a plurality of towers, each of which towers defines a first side and a second side opposite said first side, and wherein each of said towers comprises:
      at least two turbine blades rotatably mounted to an axle extending from said first side of said tower and coupled to a generator configured for generating electricity; and
      at least one tower antenna mounted to said second side of said tower, said at least one tower antenna being configured for transmitting signals to at least one remote antenna; and
   wherein said plurality of towers are spaced apart and substantially aligned in a line and oriented such that said axle of each said tower is substantially perpendicular to said line, and such that said first side of each tower is facing in substantially the same direction as said second side of an adjacent tower.

9. The tower of claim 8, wherein said at least one tower antenna is further configured for receiving signals from said at least one remote antenna.

10. The tower of claim 8, wherein said towers are combination towers, and said system further comprises at least one communication tower positioned proximate to said combination towers, said at least one communication tower including at least one communication tower antenna mounted thereto for transmitting signals to at least one remote antenna.

11. A tower comprising:
    a substantially horizontal axle mounted to said tower;
    at least two turbine blades rotatably mounted to said axle on said tower and coupled to a generator configured for generating electricity;
    at least one tower antenna mounted to said tower, said at least one tower antenna being configured for transmitting signals to at least one remote antenna; and
    wherein said substantially horizontal axle is rotatable about a vertical axis of said tower from a predetermined angle away from said at least one tower antenna to a second predetermined angle toward said at least one tower antenna to thereby substantially avoid impedance by said at least two turbine blades of transmitting signals from said at least one tower antenna to said at least one remote antenna.

12. The tower of claim 11, wherein said at least one tower antenna is further configured for receiving signals from said at least one remote antenna.

13. A method for transmitting signals from a tower having at least two rotating turbine blades mounted to said tower and coupled to a generator configured for generating electricity, the method comprising steps of:
    mounting at least two tower antennas to said tower proximate to said at least two rotating turbine blades, said at least two tower antennas being configured for transmitting signals to at least one remote antenna, wherein said at least two tower antennas are positioned so that said at least two rotating turbine blades do not simultaneously impede a line of sight transmission from all of said at least two tower antennas to said at least one remote antenna; and
    transmitting signals alternately from said at least two tower antennas to said at least one remote antenna as said at least two tower antennas alternately transmit signals unimpeded by said at least two rotating turbine blades.

14. The method of claim 13, wherein said at least two tower antennas are further configured for receiving signals from said at least one remote antenna.

15. The method of claim 13, wherein said signals comprise at least one of cellular telephone signals, television signals, radio signals, and short wave signals.

16. The method of claim 13, wherein said at least two turbine blades consist of three turbine blades.

17. The method of claim 13 wherein the step of mounting further comprises rotatably mounting said at least two turbine blades on an axle secured to said tower, and positioning at least a first one of said at least two tower antennas on said tower above said axle, and positioning at least a second one of said at least two tower antennas on said tower below said axle.

18. The method of claim 13 further comprising the step of operating said at least two tower antennas contemporaneously at the same level of power.

19. The method of claim 13 further comprising the step of independently operating each of said at least two tower antennas at diminished power levels when the transmission of signals from a respective antenna is impeded by one of said at least two turbine blades.

* * * * *